July 25, 1950　　　R. F. DEIMEL ET AL　　　2,516,187
CALCULATING INSTRUMENT

Filed Feb. 24, 1945　　　　　　　　　　　　8 Sheets-Sheet 1

INVENTORS
RICHARD F. DEIMEL
WILLIAM A. BLACK
BY
ATTORNEY

July 25, 1950     R. F. DEIMEL ET AL     2,516,187
CALCULATING INSTRUMENT Filed Feb. 24, 1945     8 Sheets—Sheet 4

INVENTORS
RICHARD F. DEIMEL
WILLIAM A. BLACK
BY
ATTORNEY

July 25, 1950  R. F. DEIMEL ET AL  2,516,187
CALCULATING INSTRUMENT
Filed Feb. 24, 1945  8 Sheets-Sheet 5

INVENTORS
RICHARD F. DEIMEL
WILLIAM A. BLACK
BY 
ATTORNEY

July 25, 1950 R. F. DEIMEL ET AL 2,516,187
CALCULATING INSTRUMENT
Filed Feb. 24, 1945 8 Sheets-Sheet 6

INVENTORS
RICHARD F. DEIMEL
WILLIAM A. BLACK
BY
*H. H. Huber*
ATTORNEY

July 25, 1950  R. F. DEIMEL ET AL  2,516,187
CALCULATING INSTRUMENT
Filed Feb. 24, 1945                                                      8 Sheets-Sheet 8

INVENTORS
RICHARD F. DEIMEL
WILLIAM A. BLACK
BY
ATTORNEY

Patented July 25, 1950

2,516,187

UNITED STATES PATENT OFFICE 2,516,187

CALCULATING INSTRUMENT

Richard Francis Deimel, Hoboken, and William Alexander Black, Montclair, N. J., assignors to General Time Corporation, a corporation of Delaware Application February 24, 1945, Serial No. 579,582

23 Claims. (Cl. 33—70)

This invention relates to calculating instruments and, more particularly, to averaging devices for automatically and directly rendering an arithmetical average of the changing value of a variable quantity, or of observations, readings, or indications of an observation instrument during a continuous sight, and the object of the invention is to provide an improved mechanical calculating device of this kind.

It is customary, when making observations or measurements that are dependent on the human faculties, to take a number of readings and utilize their average value, in order more nearly to approach accuracy. This is especially desirable when the observations are made under difficult or trying conditions as, for example, in making celestial observations from aircraft. Accordingly, the purpose of the invention is to provide a calculating mechanism which will give directly, and without the time and labor of mental calculation, the average value measured when taking a continuous sight with such an instrument, for example, a sextant, octant, transit, range finder, or other angle or distance measuring instrument.

The basis for the determination of the location of aircraft or marine vessels in degrees longitude and latitude at any given time is a measurement of the altitude at that time of a celestial body such as the sun, moon, or certain stars. The altitude of the celestial body is its angle of elevation, that is to say, the measurement to be made is the angle between a line passing through the celestial body and the point where the measurement is made, and a horizontal plane passing through the same point.

In order to know accurately the location of the point of observation it is necesary to measure this angle with a high degree of precision. There are many factors which affect the accuracy of altitude measurement, particularly on aircraft. One such factor is the influence of minor erratic accelerations, which the aircraft may be undergoing during the time the readings are taken, on the bubble which is commonly used in such observation instruments as a means of determining the horizontal plane. Observations are not made when the accelerations are large. Other such factors are the difficulty in taking or maintaining a sight on the celestial body caused by the motion of the aircraft, and the fact that the measurement is dependent on the human faculties.

It is customary when making such observations, either to take a number of readings and obtain their average value, or to take a continuous sight on the celestial body during a more or less prolonged period of time; about two minutes is usually sufficient. In the latter case it has heretofore been necessary, either to estimate the reading of the observation instrument at the middle of the period of the observation, or to utilize mechanism for integrating the average reading during the time of sight, which required the calculation of a correction factor from the readings of a number of different dials, and the application of this factor to the final reading. The purpose of the present invention is to provide a calculating mechanism which will give directly, and without the time, labor, and effort of mental calculation, the average value of observations with a sextant or other observation instrument.

Since the position of a celestial body with respect to a point on or above the surface of the earth changes continuously with the time, in measuring the altitude of the body it is desirable to ascertain its average altitude during the period of observation. Accordingly, the invention also aims to provide an improved device which, when used on a sextant or other appropriate altitude measuring instrument will, at the end of the period of observation, automatically and substantially instantaneously render the average altitude of the celestial body during the period of observation and without mental calculation or estimating of any kind.

In making observations from aircraft, due to its own rapidly changing position and the presence of clouds, or otherwise, it is often impossible to take readings during a predetermined period of time, even a period as short as two minutes. Therefore, a further purpose of the invention is to provide an averaging mechanism for sextants and the like by means of which a dependable average measurement of the altitude of a celestial body can be obtained independently of the length or duration of the period of observation, and which will so nearly correspond with the true altitude that the position of the observer can be known more precisely than heretofore.

It is important in the operation of aircraft that the navigating officer be relieved of even simple mental calculations in order that he may devote his attention to other duties. Another object of the invention is, therefore, to provide an averaging mechanism for sextants and the like which, in addition to averaging automatically the altitude of the celestial body during a previously undetermined period of observation, also indicates one-half the period of observation.

The construction and operation of the calculating instrument of the present invention will be understood from a consideration of the accompanying drawings which, by way of example, illustrate the mechanism of the invention as applied to a sextant. It will be understood, however, that the improved averaging mechanism has a variety of applications and is capable of averaging the values of numerous other variable quantities such, for example, as temperature, pressure, velocity, power consumption or power production, the flow of fluids, etc.

Figure 1:
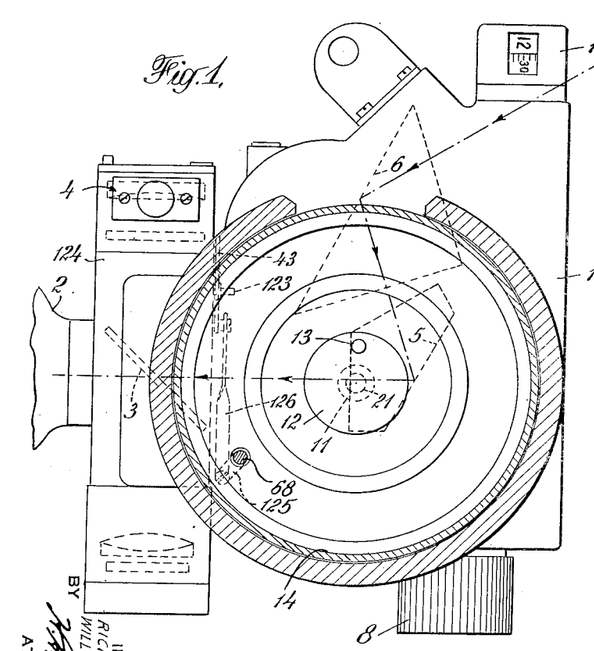
Fig. 1 is a view indicating the principal elements of a sextant, being a section taken on the line 1—1 of Fig. 4.
Figure 2:
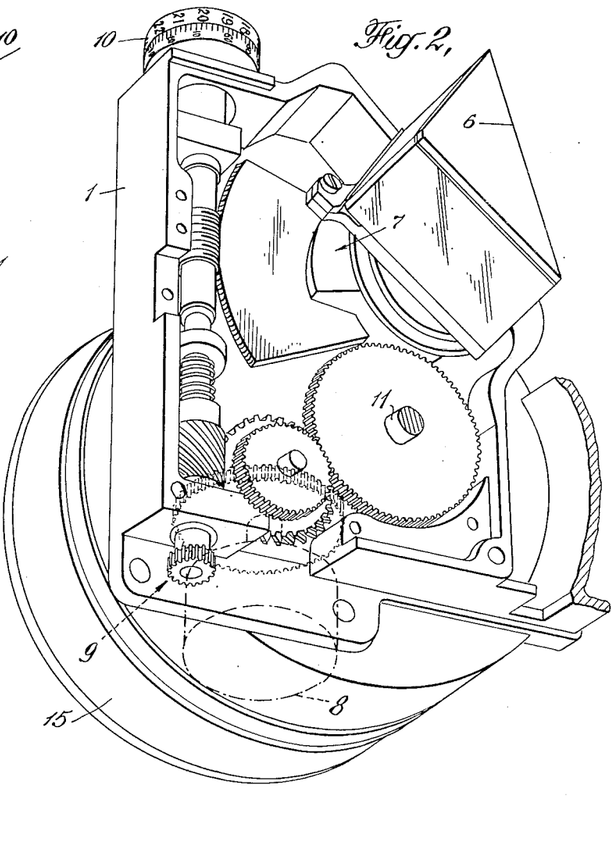
Fig. 2 is a perspective view of the sextant looking at the instrument from its opposite side, with the cover of its casing removed to show the gearing interconnecting its various movable parts.
Figure 3:
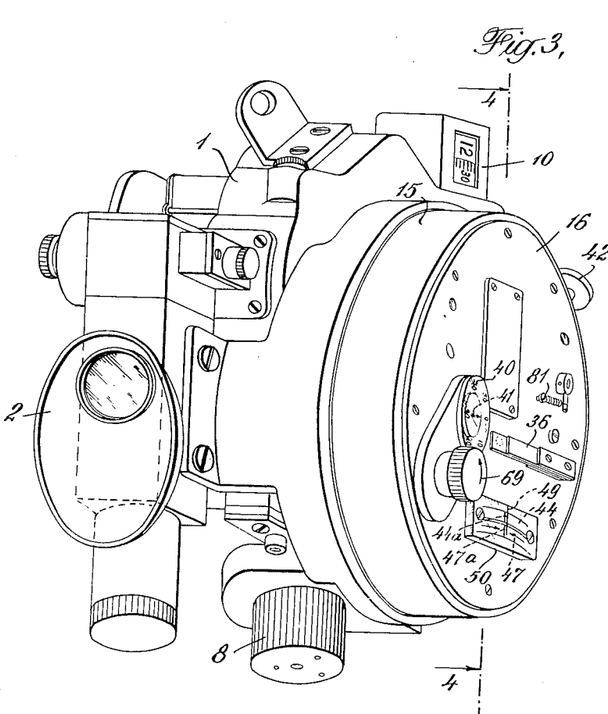
Fig. 3 is a perspective view of the sextant looking from the same side of Fig. 1, and showing the operating face of the improved averaging mechanism with its cover removed.

Referring now to the accompanying drawings, there is illustrated generally in Figs. 1, 2 and 3 a bubble sextant of the type in common use on aircraft, and also on shipboard. Figs. 2 and 3 show the application of the improved averaging device of the present invention to the instrument.

The sextant comprises a housing 1, on and within which are the various operating parts, including an eye-piece 2, a reflector 3 in which may be seen an image of the bubble in the bubble chamber 4, a fixed prismatic mirror 5 and a movable prismatic mirror or field prism 6. Field prism 6 is mounted on a sector assembly 7 which is adjustable about an axis at right angles to the plane of Fig. 1 by means of a rotatable control knob 8 which is operatively connected with the sector assembly 7 by means of a gear train indicated generally by numeral 9 and illustrated in Fig. 2. Knob 8 is manually rotated during the operation of the sextant to effect coincidence of the image of the bubble and the image of the celestial body. With this adjustment made, an odometer type of counter 10 actuated by the gear train 9 indicates the altitude angle in degrees and minutes.

The rotation of the sextant control knob 8 also causes through gear train 9, the rotation of a shaft 11 which operates the averaging mechanism. For this purpose shaft 11 terminates, at the opposite end from that shown in Fig. 2, in a head 12 (Figs. 1 and 4) having a driving pin 13 by means of which operating connection with the averaging mechanism is made. The driving head 12 is located at the center of the bottom of a circular recess 14 in the sextant housing 1.

Figure 4:
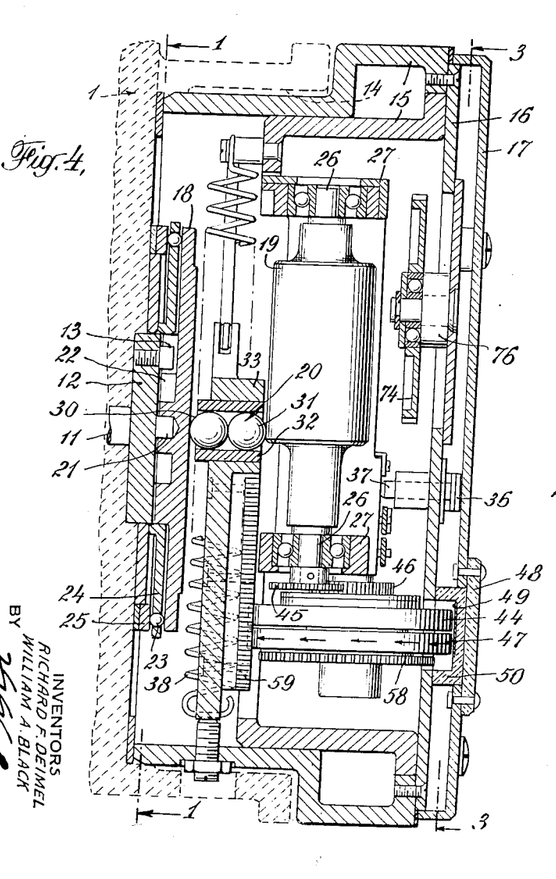
Fig. 4 is a sectional view of the mechanism of the invention taken on the plane indicated by the line 4—4 in Figs. 3 and 5, looking in the direction of the arrows.

The averaging mechanism is located within a stepped cylindrical housing 15, the inner and smaller end of which is received within circular recess 14, as shown in Fig. 4. The outer end of housing 15 is closed by a circular frame plate 16 and a cover 17. Shaft 11 and sector assembly 7 which mounts the field prism are geared by gear train 9 to turn through the same angular distances for any given angular movement of knob 8. Also, as is customary, the arrangement of gear train 9 is such that for each complete revolution of knob 8 these parts and the counter 10 move ten degrees of angle of elevation or altitude angle.

The averaging mechanism comprises an indicating member in the form of a flat circular disk 18, an averaging member in the form of a rotatable cylindrical drum 19, and a transmission mechanism or gearing arranged to transmit motion between disk 18 and drum 19, which is indicated generally by numeral 20. Shaft 11 might more accurately be referred to as the indicating member of the averaging mechanism since it moves or is angularly adjusted according to the value of the altitude angle as determined by the sextant mechanism, and its angular position is shown by counter 10.

Disk 18 rotates with shaft 11 and is centered on it by means of a pin 21 which projects from the center of head 12 and is received within a central aperture in the disk. Driving pin 13 is received within a closely fitting radial slot 22 in the bottom of the disk. This provides a releasable connection permitting the averaging mechanism to be removed from the sextant for repair or replacement. To prevent distortion of the disk and to enable it to turn with as little friction as possible, it is supported near its periphery by a series of balls 23 held in a cage 24 rolling on a circular track 25.

Figure 7:
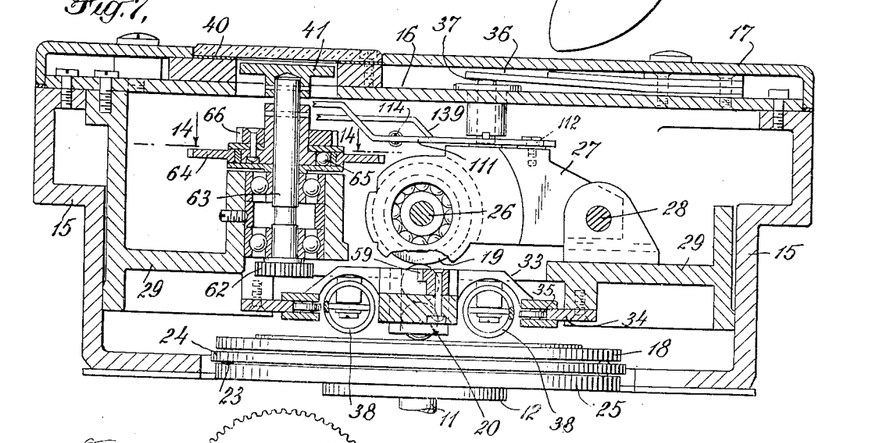
Fig. 7 is a sectional view somewhat similar to Fig. 6 but taken along the broken line 7—7 of Fig. 5 and also looking toward the left.

The axis of drum 19 is parallel to the face of disk 18 and intersects the projection of the axis of the disk, as will be understood from Figs. 4 and 7, and also from the diagrammatic views 20 to 23 inclusive. Drum 19 has integral shaft projections 26 at each end by means of which the drum is supported for rotation (preferably in ball bearings as shown) by means of a yoke member 27 (Fig. 7) which is pivoted at 28 to brackets secured to a frame structure 29 mounted within housing 15. The axis of pivots 28 is parallel to the axis of drum 19 and to the surface of disk 18.

Figure 8:
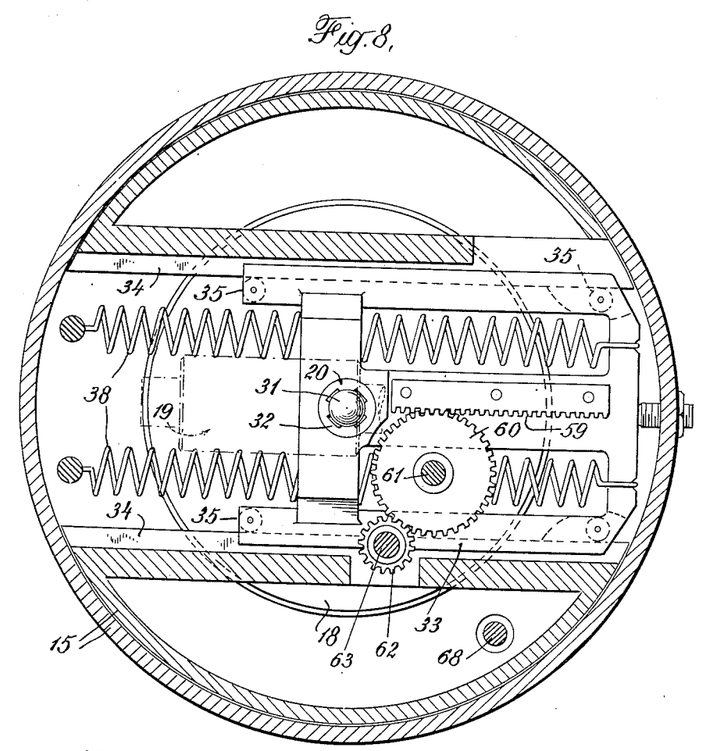
Fig. 8 is a sectional view taken on the line 8—8 of Fig. 6.

The friction gearing or transmission mechanism 20 comprises two balls 30 and 31 and a cage 32 which is mounted on a carriage 33 movable parallel with the surface of disk 18 (Fig. 8). For this purpose carriage 33 moves between two parallel guides 34 extending across the housing 15 equidistant from the center of disk 18. Rollers 35 are provided to reduce friction. The two balls 30 and 31 are held by cage 32 always in contact with each other and with ball 30 always in contact with disk 18 and ball 31 with drum 19.

The arrangement is such that the travel of carriage 33 carries the two balls from the center of the disk outwardly in a radial direction, and during this movement ball 30 is maintained in contact with the disk on a straight line passing through its center and ball 31 makes contact with the drum along a longitudinal element of the drum. This longitudinal element, the axis of the drum, and the straight line through the center of the disk, are substantially coplanar. A line through the points of contact between ball 30 and the disk, between the ball 31 and the drum, and between the two balls, is perpendicular to the plane of the disk and passes through and is perpendicular to the drum axis. This line will be referred to as the contact line.

The pivotal mounting of drum 19 on yoke 27 permits the two balls 30 and 31 to be placed under pressure along the contact line with enough force to prevent slipping at the points of contact with each other and with the disk and drum. This pressure is produced by means of a flat spring 36 (Fig. 7) which is fixed to frame plate 16 and which engages the outer end of a pin 37 whose inner end bears upon yoke 27.

When the value of a varying quantity is to be averaged with respect to time, a clockwork mechanism is provided to move carriage 33 at a constant rate outward from the position shown in Fig. 8 where the contact line passes through the center of disk 18 to any position at which it is desired to terminate the averaging period. The main spring of this clockwork mechanism comprises two coil springs 38 (Fig. 8), the right-hand ends of which are attached to carriage 33 and whose left-hand ends are fixed to housing 15.

The clockwork mechanism will be described in detail later, including the balance wheel escapement mechanism indicated generally by numeral 39 which controls the time rate or velocity at which the carriage 33 moves outward. There is a time dial 40, and a rotatable time index 41 having an index mark or "hand" is geared to indicate one-half the duration of the averaging period. These are visible through a Lucite window in cover 17. A button 42 is provided which actuates mechanism to be described later for starting (and under certain conditions also for stopping) the clockwork mechanism.

At the beginning of an observation period button 42 is pressed inwardly and held by the fingers and released at the end of the observation period. If this period continues for a predetermined length of time until the contact line of transmission mechanism 20 has reached a position adjacent the edge of disk 18, the clockwork mechanism is stopped automatically, and simultaneously a shutter 43 (Fig. 6) is actuated to cut off the admission of light to the eye-piece 2, thereby notifying the user of the instrument that the end of the observation period has been reached.

The duration of this maximum observation period may conveniently be two minutes, in which case time dial 40 may be graduated to seconds and make one complete revolution in sixty seconds. However, the mechanism may be constructed to have this period longer or shorter than two minutes if desired. If the observation period is less than the maximum the release of button 42 stops the clockwork.

The turning movement of drum 19 is shown by means of a drum index dial 44, the construction of which will be described in detail later on, but which in general is rotated by means of a gear 45 fixed to the end of one of the shaft projections 26 of drum 19. Gear 45 meshes with a second gear 46 which causes the rotation of index dial 44. Alongside of index dial 44 is a direction dial 47. These two dials are arranged to be visible through a Lucite window 48 mounted on cover 17.

Index dials 44 and 47 carry index marks 44a and 47a respectively, which at the start of each observation, and in a manner to be described later, are brought into registry with a stationary index mark 49 provided on the inside surface of a Lucite structure 50 which covers dials 44 and 47 where they project through frame plate 16. The purpose of direction dial 47 is to show whether drum index 44 has moved clockwise or counter-clockwise from the fixed index mark 49 during the averaging period.

The general operation of the averaging mechanism of the invention may be understood more especially from Figs. 20 to 24 inclusive, although the specific mechanism shown in Figs. 1 to 19 inclusive contains features yet to be described and whose operation will be detailed later on. In these figures the parts of the averaging mechanism are illustrated diagrammatically for the sake of clarity. The operating shaft 11 for the averaging mechanism is considered as having the indicating member or disk 18 of the averaging mechanism fixed directly to it instead of being releasably connected therewith as shown in Fig. 4 and previously described.

Also, the index dial 44 takes the form of a pointer or hand, rotating with respect to fixed index mark 49 and driven by a bevel gearing 51 from shaft projection 26 of drum 19, in order to show the extent or amount of rotation of the drum. However, one important feature of this invention is that the numerical value of this amount need not be known; the drum radius may have any convenient value. Ball drive 20 moves to the right from the center of disk 18 instead of to the left as shown in Fig. 4. A stationary scale 52 graduated in degrees cooperates with an index mark 53 on disk 18 to indicate the angular position of the disk, and the operating knob 8 of the sextant is shown as connecting with operating shaft 11 through a bevel gearing 54 which corresponds to gear train 9 of the sextant.

Figures 20, 20A, 21, 22, 23, 24:
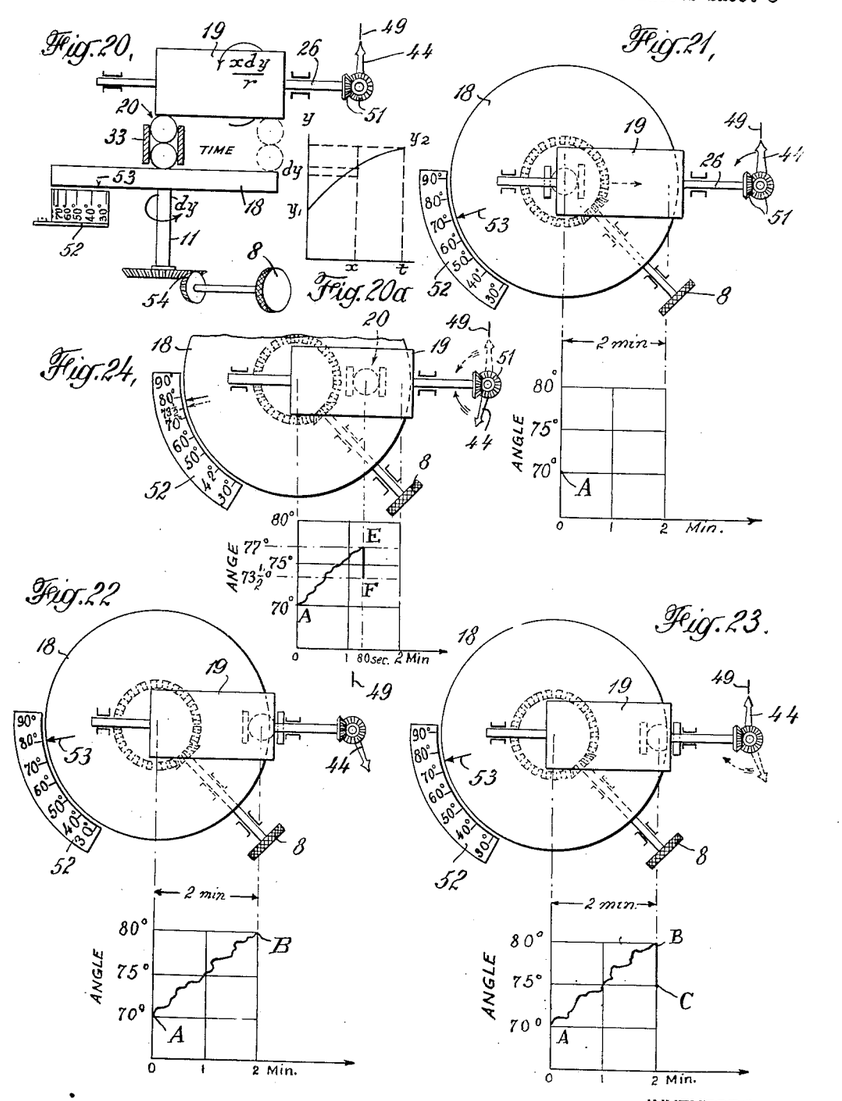
Fig. 20 is an explanatory diagrammatic view in side elevation of the parts of the averaging mechanism.
Fig. 20a is a graph explaining the calculation performed by the averaging mechanism.
Figs. 21 to 24 inclusive are explanatory diagrammatic views showing the same parts in plan and in different positions.

Assuming that the ball transmission 20 in a two-minute period moves from the full line position shown in Fig. 20 to the dotted line position, and that the altitude of the celestial body increases during this period from seventy to eighty degrees (this change being exaggerated for the sake of clearer illustration), index mark 53 will be opposite seventy degrees on scale 52, the position to which disk 18 will be turned by knob 8 at the commencement of the observation (Fig. 21).

At this instant starting button 42 is pressed and the clockwork mechanism commences to move the ball drive 20 toward the right. The observer keeps a continuous sight on the celestial body and, in so doing, turns knob 8 to hold the image of the body in coincidence with the bubble. The index mark 53 on disk 18 is thereby advanced away from the seventy-degree mark and toward the eighty-degree mark. In the graph at the lower part of Fig. 21 the initial seventy-degree angular position of disk 18 is indicated by the point A.

The ball drive 20 constitutes, with disk 18, a continuously variable ratio friction gearing or transmission mechanism between shaft 11 of the disk and shaft 26 of drum 19. The transmission ratio depends on the distance of the contact line of ball drive 20 from the center of disk 18, and increases as this distance increases. The observer, in turning knob 8 to maintain the celestial body in coincidence with the bubble, gradually rotates disk 18 and this rotation is transmitted through ball drive 20 to drum 19, thereby causing index 44 to move toward the left from the index mark 49. The amount of movement of index 44 increases as ball drive 20 moves farther and farther away from the center of disk 18. If the observation is made at a time when the celestial body is declining rather than ascending index 44 will move towards the right.

At the end of the observation period ball drive 20 will have reached the position shown in Fig. 22, disk 18 having been turned until index mark 53 is opposite eighty degrees on scale 52, this value being indicated at the point B in the graph. If readings had been plotted at intermediate positions between the beginning and end of the observation period a curve would have been drawn somewhat as shown at AB, the fluctuations being caused by one or more of the factors mentioned previously.

The angular position of drum 19 at the end of the observation period is shown by index 44 in Fig. 22. The amount of this angular displacement of drum 19, caused by the angular movement of disk 18 during the observation period while the ratio of the continuously variable ratio gearing is being increased at a constant rate commencing at zero, is such that if this angular displacement is transmitted to disk 18 at the final ratio of the gearing, that is to say, while ball drive 20 is held at the position shown in Fig. 22, the angular position of disk 18 will be modified or shifted to a position which represents the average value of the variable quantity during the averaging period, in this case the altitude of the celestial body being observed.

Fig. 23 illustrates this. Operating knob 8 has been rotated in a direction to cause index 44 to be returned to coincidence with stationary index mark 49. That is to say, index 44 has been returned to its original position by moving it in a direction opposite to that in which it moved during the observation period. In so doing, disk 18 has been moved backwards until index mark 53 is opposite a value of seventy-five degrees on scale 52, which corresponds to the position C shown in the graph at the lower part of Fig. 23, and which is the average angular position of disk 18 during the averaging period.

In the above description of the operation of the averaging mechanism as used in connection with a sextant, only a two-minute fixed period of observation has been considered. It will be understood, however, that the period of observation need not be fixed or predetermined. That is to say, if a cloud cuts off the celestial body from view before the ball transmission 20 has reached the limit of its outward radial movement which, in the mechanism illustrated, requires two minutes, or if for any other reason it is necessary or desirable to terminate the period of observation before the two minutes have expired, the observer may release the button 42 and thereby stop the further advance of ball transmission 20.

For example, referring to Fig. 24, button 42 might be released at the end of 80 seconds, in which event the ball drive would have reached the approximate position shown in this figure. During this time disk 18 might have been rotated by knob 8 to the seventy-seven-degree position indicated by the point E in the graph at the bottom of Fig. 24; and this would have caused the index dial 44 to be turned to the full line position of Fig. 24. Upon turning knob 8, with the ball drive 20 remaining in the final position which is shown in this figure, until index dial 44 has been returned to its initial position in registry with stationary index mark 49, disk 18 will have been moved back to the average value of the altitude angle during the 80 second period, which can be read directly from the scale 52 as seventy-three and one-half degrees. The dotted line position of index mark 53 indicates this position, and in the graph it is indicated by the point F.

In both of the illustrations of operation above given, the celestial body has been assumed to be rising rather than declining, so that the average value of its altitude is less than the altitude at the end of the period of observation. Hence in order to obtain the value of the average angle, disk 18 was turned backward. In the event, however, that a sight is taken while the celestial body is declining instead of rising, the average value of the altitude will be greater than the altitude at the end of the observation. Accordingly, disk 18 will be advanced until index dial 44 is in registry with stationary index mark 49, instead of being turned backward. In the case of a sight taken while the celestial body is rising, index dial 44 will be turned clockwise until it is brought into registry with stationary index mark 49, while in the case of a sight taken while the celestial body is declining the index dial 44 will be turned counter-clockwise.

In bringing index dial 44 back to the stationary index mark 49 it is always moved in the direction opposite to its movement during the observation period. Consequently, to enable an observation to be taken as quickly as possible the averaging mechanism is provided with the direction dial 47 (Fig. 5) previously referred to. The arrows on this dial show the direction in which index dial 44 should be moved at the end of the observation period.

Figures 5, 11, 12, 13:
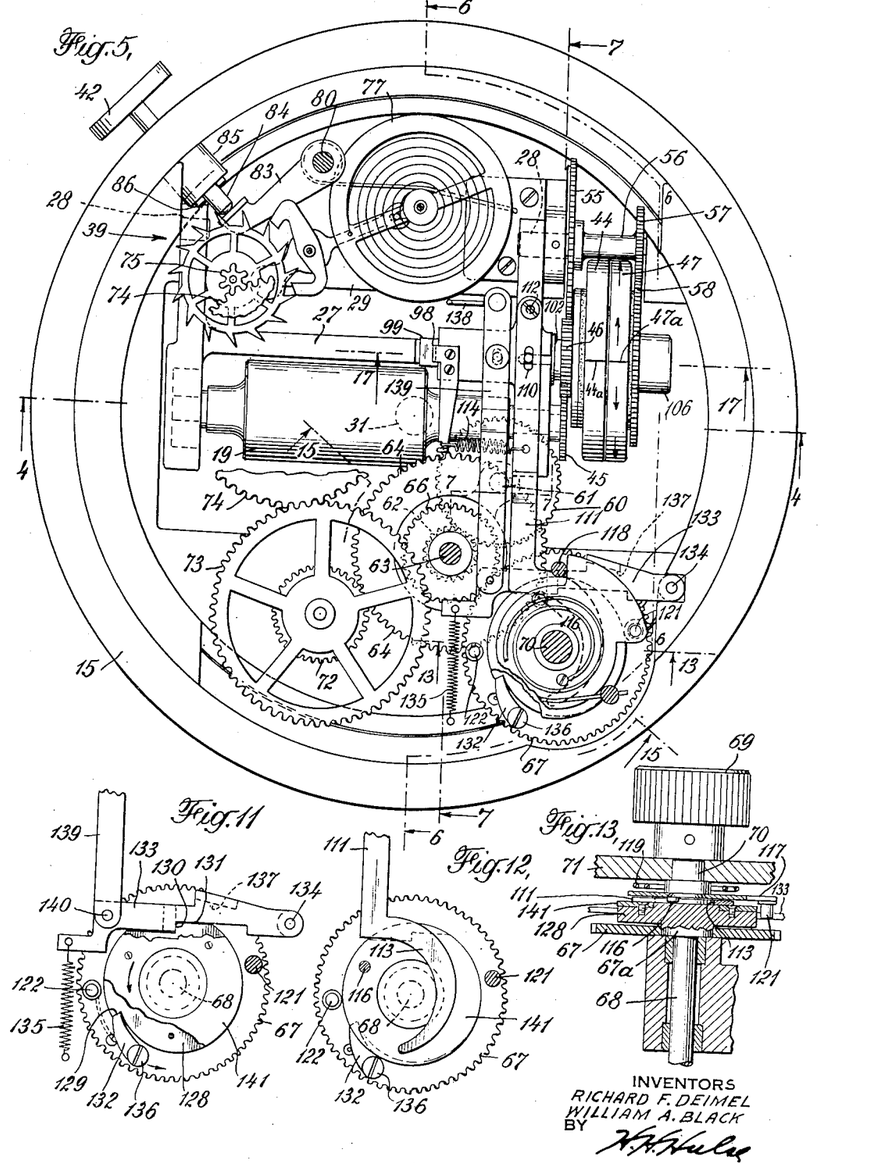
Fig. 5 is a plan view of the averaging mechanism, with the cover and outer frame plate removed, and with certain parts shown in section, taken on the line 5—5 of Fig. 6.
Fig. 11 is a detail view of parts of the shutter and automatic time stop setting and trip mechanism, being a section taken on line 11—11 of Fig. 6.
Fig. 12 is a detail section taken on line 12—12 of Fig. 6.
Fig. 13 is a detail section of the winding mechanism taken on line 13—13 of Figs. 5 and 15.
Figure 6:
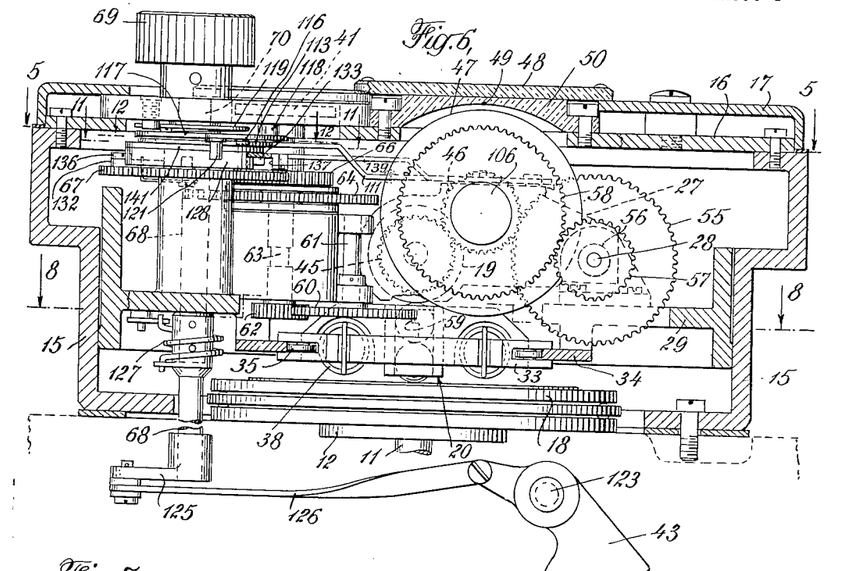
Fig. 6 is a sectional view, taken at right angles to Fig. 4 and along the broken line 6—6 of Fig. 5, looking toward the left as indicated by the arrows.

Direction dial 47 is rotated in the same direction as index dial 44 by means of the gearing shown in Figs. 5 and 6. This includes a large gear 55 meshing with gear 46 and fixed to a hub 56 on the outer end of which is a gear 57 which meshes with another gear 58 which drives direction dial 47. Hub 56 rotates on a fixed pin which constitutes one of the pivots 28 for the yoke 27.

It will be understood that in taking an actual observation with a sextant equipped with the device of this invention, as shown in Figs. 1 to 19 inclusive, the altitude angle will be read on the counter 10 which, in the actual mechanism, takes the place of the diagrammatic index 52. Furthermore, one-half the time of the averaging period can also be read from the position of the time index 41 with respect to time dial 40. In the case of the first two examples of operation above, time index 41 will make one complete revolution which requires 60 seconds, whereas in the third example, where the duration of observation was 80 seconds, time index 41 will indicate 40 seconds. The theory of the averaging mechanism of the invention may be explained in conjunction with Fig. 20. In the graph shown in Fig. 20a $y$ is the angle through which the disk 18 has been turned during the time it has taken the carriage 33 to move outward to a position $x$ from the center; $y_{AV}$ is the average angle and the time of observation is $t$. Then $$ty_{AV} = \text{Area under the } (y_1 y_2) \text{ curve}$$

$$ty_2 = \text{Area of dotted rectangle}$$

$$\int_{y_1}^{y_2} X\,dy = \text{Area above } (y_1 y_2) \text{ curve}$$

whence $$ty_{AV} = ty_2 - \int_{y_1}^{y_2} X\,dy$$

or $$y_{AV} = y_2 - \frac{1}{t}\int_{y_1}^{y_2} X\,dy \qquad (1)$$

An increment of angle $dy$ of the disk 18, with carriage 33 at X turns the cylinder of radius $r$, through an angle $$\frac{X\,dy}{r}$$

and the total drum 19 angle is $$\int_{y_1}^{y_2} \frac{X\,dy}{r}$$

The disk and cylinder, in position $t$, are geared in the ratio $$\frac{r}{t}$$

Turning the cylinder back to its initial position through an angle $$\int_{y_1}^{y_2} \frac{X\,dy}{r}$$

turns the disk back an amount $$\frac{r}{t}\int_{y_1}^{y_2} \frac{X\,dy}{r} = \frac{1}{t}\int_{y_1}^{y_2} X\,dy$$

and thus according to Equation No. 1 subtracts this term from $y_2$ and sets the counter to the average value of $y_{AV}$.

Referring now to the details of construction of the sextant averaging mechanism shown in Figs 1 to 19 inclusive, the gear train interconnecting the carriage 33 for the ball transmission 20 begins with a rack 59 (Fig. 8) with which meshes a gear 60 which is fixed to the lower end of a stub shaft 61 (Fig. 6). Gear 60 in turn meshes with a gear 62 which is fixed at the lower end of a second shaft 63 which carries the time index dial 41 at its upper end. Shaft 63 preferably is mounted to rotate in ball bearings, (as shown in Fig. 7) and just above these bearings there is a large gear 64 which drives the escapement mechanism 39 through a train of gears to be described presently.

Figure 14:
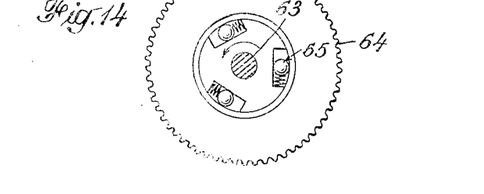
Fig. 14 is a detail section taken on line 14—14 of Fig. 7.

Gear 64 is not fixed directly to shaft 63 but is connected to it by a ball clutch 65 shown in Figs. 7 and 14. Shaft 63 turns in a direction opposite to that of the arrow shown in Fig. 14 under the action of main spring 38 while the clock mechanism is running to drive the escapement mechanism through ball clutch 65 and gear 64. Ball clutch 65 permits shaft 63 to be turned in the opposite direction in winding the clock mechanism. For this purpose a gear 66 is fixed to shaft 63 just above gear 64 and with gear 66 there meshes a larger gear 67 which rotates freely on an enlargement 67a near the upper end of a shaft 68 which is parallel with shaft 63 (Figs. 6 and 13). A winding knob 69 (Figs. 13 and 15) is pinned to the outer end of a short shaft 70 arranged to turn in a bearing aperture in a thick plate 71 mounted on the outside of frame plate 16. Shaft 70 is aligned with shaft 68 and, by mechanism to be described which is mounted on the lower end of shaft 70, the turning of knob 69 effects the turning of shaft 68. This turns gears 67, 66, 62 and 60 to rotate shafts 63 and 61 and shift carriage 33 to the right as shown in Fig. 8 to wind main springs 38 and simultaneously to position the contact line of the ball transmission 20 on the center of disk 18. During such operation shaft 63 rotates in the direction of the arrow shown in Fig. 14, and because of the presence of ball clutch 65 does not impart rotation to driving gear 64 of the escapement mechanism 39.

When the winding knob 69 is released, main springs 38 immediately tend to rotate all of the shafts and gearing referred to in the opposite direction, and, when button 42 is pressed, shaft 63, rotating in the direction opposite to that indicated by the arrow in Fig. 14, turns gear 64 through the ball clutch mechanism. Gear 64 drives the escapement mechanism 39 through a train of gearing shown in Figs. 9 and 5. In this train gear 64 drives a gear 72 which is made compositely with an adjacent larger gear 73. Gear 73 in turn meshes with a large idler gear 74 which drives pinion 75 of the escapement mechanism. Idler gear 74 rotates on a stub shaft structure 76 (Fig. 4) which is mounted on frame plate 16. The composite gears 72 and 73 have a similar mounting (not shown). Escapement mechanism 39 may be of any suitable construction having a balance wheel 77 (Figs. 9 and 10).

Figure 9:
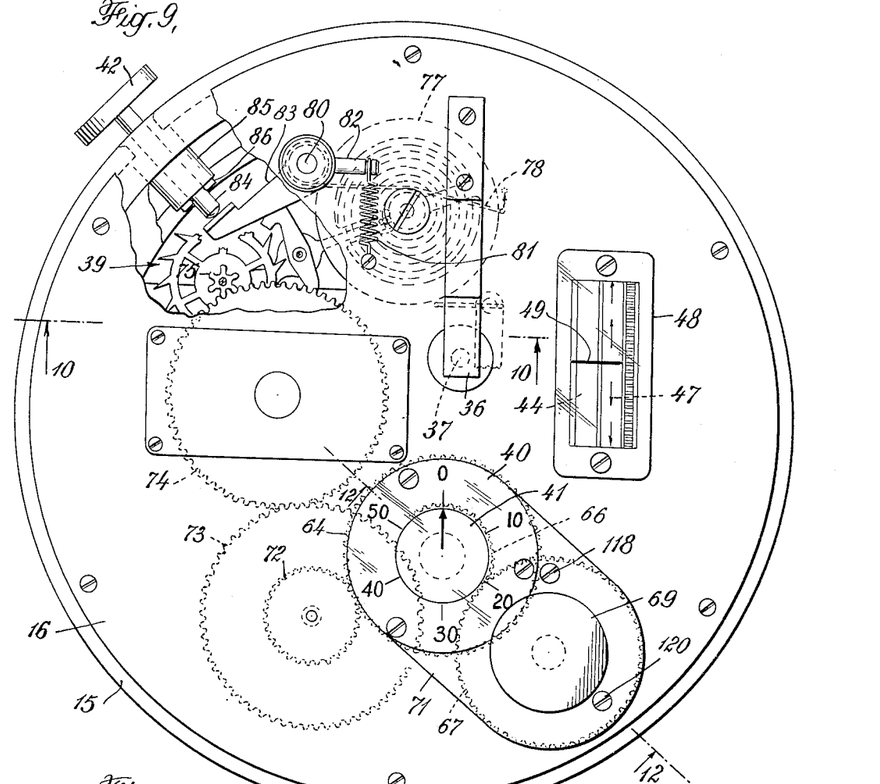
Fig. 9 is a plan view of the operating face of the averaging mechanism shown in Fig. 3, with parts of the cover and upper frame plate broken away.
Figure 10:
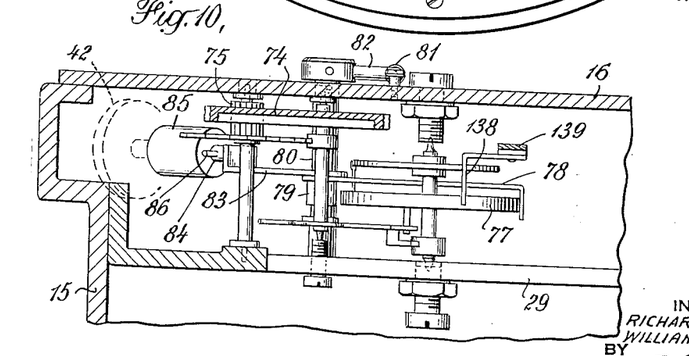
Fig. 10 is a fragmentary section taken on the line 10—10 of Fig. 9.

The mechanism for starting and stopping the clockwork mechanism is also shown in Figs. 5, 9 and 10. A flexible resilient arm 78 made of a slender spring wire and having its end bent to engage the outer surface of balance wheel 77 is attached to a hub 79 which is fixed to a rock shaft 80 mounted parallel with the axis of the balance wheel 77. A comparatively stiff coil spring 81 has its movable end joined to an arm 82 which is also fixed to shaft 80 and tends to rock shaft 80 in a direction to cause flexible arm 78 to frictionally engage the outer surface of balance wheel 77 and hold the balance wheel stationary. An actuating arm 83, also fixed to shaft 80, is engaged by the inner end of a rod 84 on the outer end of which trip button 42 is mounted. Rod 84 slides in an elongated bushing 85 which is fixed to the housing 15 and a pin 86 engages the inner end of bushing 85 and serves as a stop for limiting the movement of the parts by coil spring 81.

Button 42 is both a starting and a stopping button. When it is pushed inwardly the rocking of shaft 80 causes flexible resilient arm 78 to swing in the direction of the arrow shown in Fig. 9. The location of rock shaft 80 with respect to the pivots of balance wheel 77 being such that during the first part of this movement there is sufficient frictional engagement with the surface of the balance wheel to start the balance wheel in rotation. Thereafter, the end of arm 78 moves out of contact with the surface of the balance wheel and permits the balance wheel to oscillate as long as it is desired to operate the clockwork mechanism. When button 42 is released, the end of arm 78 returns into frictional engagement with balance wheel 77 and stops the mechanism.

At the start of each observation with the sextant it is not only necessary to wind the clockwork mechanism and set the contact line of ball transmission 20 on the center of disk 18, but also to bring the index marks 44a and 47a of the index and direction dials 44 and 47 respectively, into registry with the stationary index mark 49. This is done by means of the mechanism shown more particularly in Figs. 17, 18 and 19.

Figure 17:
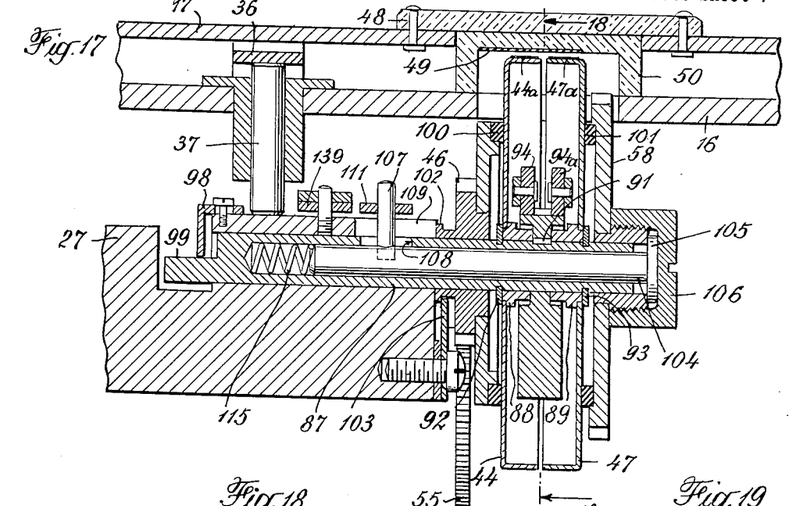
Fig. 17 is an enlarged sectional view taken on line 17—17 of Fig. 5.

The two index dials 44 and 47 consist of two similar cylindrical members, each shaped something like a tiny shallow pan. They are arranged with their open sides facing each other as shown in Fig. 17, leaving a hollow space between them. They are mounted on a sleeve shaft 87, index dial 44 having a hub 88 and dial 47 having a similar hub 89, the inner ends of which abut against the opposite sides of a heart-shaped cam 90 which is fixed to sleeve shaft 87 by means of a key 91. The outer ends of hub members 88 and 89 are held respectively by means of snap rings 92 and 93 which are received in circular grooves on the surface of sleeve shaft 87. The arrangement of these parts is such that index dials 44 and 47 may turn easily on shaft 87.

Figure 18:
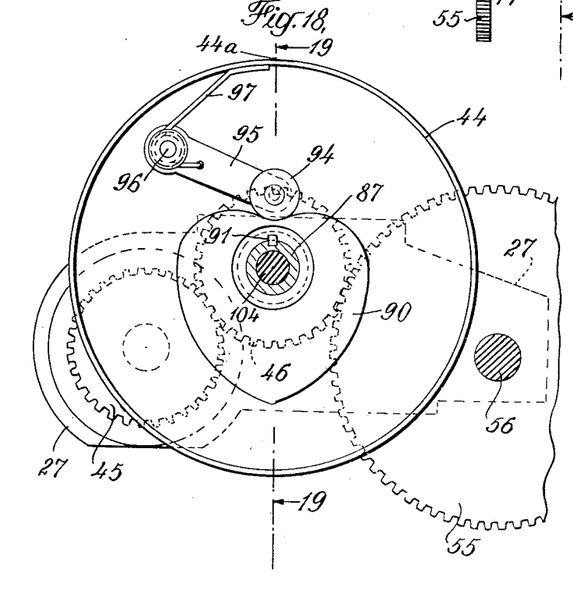
Fig. 18 is a sectional view taken on line 18—18 of Fig. 17 and drawn to the same scale.
Figure 19:
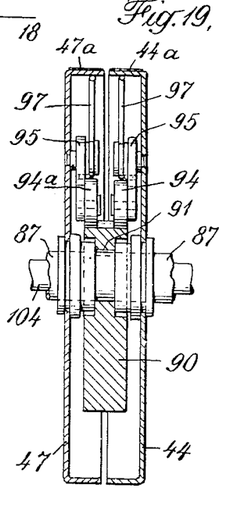
Fig. 19 is a sectional view taken on line 19—19 of Fig. 18 and drawn to the same scale.

Index dial 44 has a roller 94 coacting with heart-shaped cams 90, this roller being carried at the outer end of an arm 95 which is pivoted at its opposite end to a post 96 which projects from the inside wall of dial 44. A spring 97 surrounds post 96 and is arranged to maintain roller 94 in engagement with cam 90. Direction dial 47 is provided with a similar roller 94a mounted in precisely the same manner as roller 94 to engage heart-shaped cam 90. By means of these rollers and their spring mountings the dials 44 and 47 seek positions in which rollers 94 and 94a are at the top of heart-shaped cam 90, as shown in Fig. 18, in which positions the index marks 44a and 47a are at the top and in registry with the stationary index mark 49.

Sleeve shaft 87 is so mounted as to hold cam 90 always in this position. The sleeve is mounted in an aperture in the right-hand end of yoke member 27, as viewed in Fig. 5. To permit shaft 87 to have limited sliding movement in this aperture, for a purpose which will appear presently, and at the same time maintain cam 90 in fixed angular position, a keeper 98 is arranged to engage a flat surface 99 at the inner end of shaft 87 (Figs. 5 and 17).

Index dials 44 and 47 are rotated by gears 46 and 58 during an observation period as previously described, causing their index marks 44a and 47a to move away from the stationary index mark 49. The motion of gears 46 and 58 is transmitted to index dials 44 and 47 by means of releasable friction clutch rings 100 and 101 carried respectively by gears 46 and 58 and adapted to frictionally engage the outside faces of the respective dials 44 and 47.

In order to reset index dials 44 and 47 at "zero" position with their index marks 44a and 47a in registry with stationary index mark 49, prior to making an observation, clutch rings 100 and 101 are released from engagement with the index dials, thus allowing the inter-action of heart-shaped cam 90 with rollers 94 and 94a to cause the index dials to turn to their "zero" position. For this purpose the hub of gear 58 is slid to the right as viewed in Fig. 17 to release clutch ring 101 from index dial 47, and then sleeve shaft 87 itself, with all of the parts carried thereby, is slid in the same direction to move index dial 44 out of engagement with clutch ring 100. To prevent gear 46 and clutch ring 100 from sliding with shaft 87 the hub of gear 46 has a flange 102 engaged by a finger 103 having an arcuate end and which is fixed to the end of yoke member 27, as shown in Fig. 17.

The shifting movement of gear 58 and clutch ring 101 is accomplished by means of a rod 104 which is received within sleeve shaft 87 and has a flanged head 105 to engage a cap 106 threaded onto the hub of gear 58 and also to engage the end of this gear hub. Rod 104 has an actuating pin 107 near its inner end projecting upwardly through a closed slot 108 in sleeve 87 and an open-ended slot 109 in yoke member 27. Actuating pin 107 is engaged by the side walls of a closely fitting slot 110 in an index release lever 111 which is pivoted at 112 to yoke 27 and which, at its lower end, has a sickle-shaped cam 113, to be referred to later.

Normally, that is when clutch rings 100 and 101 are in engagement with index dials 44 and 47, release lever 111 is drawn toward the left as shown in Fig. 5 by means of a coil spring 114, one end of which is fixed to the arm and the other to an extension of keeper 98. This forces actuating pin 107 and rod 104 toward the left as viewed in Fig. 17, causing head 105 to move the hub of gear 58 toward the left and thereby press clutch ring 101 into engaging position with index dial 47. Index dial 47 is thereby urged toward the left and with it sleeve shaft 87 and index 44, the face of which is pressed against clutch ring 100.

When release lever 111 is moved about its pivot toward the right, as shown in Fig. 5, it moves actuating pin 107 toward the right, sliding rod 104 within sleeve 87. A coil spring 115 is disposed between the left-hand end of rod 104 and the bottom of the hole in sleeve shaft 87 in which rod 104 is received. Spring 115 overcomes the tendency for sleeve shaft 87 to be slid toward the left by the friction of rod 104 within it. The movement of rod 104 causes head 105 to bear against cap 106 and force gear 58 and its ring 101 out of contact with the surface of index dial 47. The side of pin 107 then engages the right-hand end of slot 108 and the continued movement of pin 107 toward the right thereby forces sleeve shaft 87 toward the right, carrying with it all the parts supported by it and shifting index dial 44 out of frictional engagement with friction ring 100. The sequence of these operations is, therefore, that direction dial 47 is first released by clutch ring 101 and immediately thereafter index dial 44 is released from clutch ring 100. Heart-shaped cam 90, acting on rollers 94, then causes both these dials to rotate to their "zero" positions.

Index release lever 111 is operated by mechanism connected with the winding knob 69, so that when this knob is turned to wind the clockwork mechanism it simultaneously effects the setting of index dials 44 and 47. Lever 111 is operated by means of a pin 116 (Fig. 12) which engages sickle-shaped cam 113 and moves the lever to the right. Pin 116 projects downwardly from the lower surface of a pin plate 117 which is fixed at the inner or bottom end of winding knob shaft 70.

Winding knob 69 requires only about a half turn to fully wind main springs 38 of the clockwork mechanism and move the carriage 33 and ball transmission 20 from its position at the edge of disk 18 to its starting position at the center of disk 18. During such a one hundred eighty-degree rotation of winding knob 69 pin plate 117 moves in the direction of the arrow shown in Fig. 16 away from a stop pin 118 and winds up a small spiral spring 119, one end of which is secured to the top side of pin plate 117 and the other end of which is fixed in a post 120 which projects downward from frame plate 71.

Figure 15:
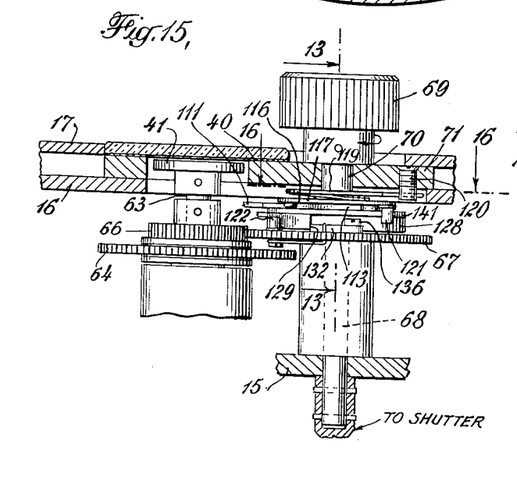
Fig. 15 is a detail section of the winding mechanism taken on broken line 15—15 of Fig. 5.
Figure 16:
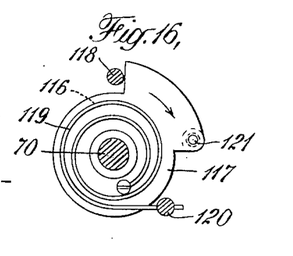
Fig. 16 is a sectional view taken on line 16—16 of Fig. 15.

In addition to pin 116, pin plate 117 also carries a winding pin 121. This pin projects downwardly from the outermost portion of plate 117 as shown in Fig. 16. As previously described, winding gear 67 turns loosely on shaft 68 which is in axial alignment with winding knob shaft 70. Winding gear 67 also is positioned in proximity to, but spaced from, pin plate 117 and has a driving pin 122 projecting from its upper surface (Figs. 11, 12 and 15). During an observation period, that is to say, while the clockwork mechanism is in operation, winding gear 67 rotates counter-clockwise as shown by the arrow in Fig. 11, carrying driving pin 122 nearly, but not quite, one hundred eighty degrees to a position adjacent winding pin 121.

When winding knob 69 is rotated to wind the clockwork mechanism, winding pin 121 engages driving pin 122 and moves it back to the position shown in Figs. 11, 13 and 15, thereby winding the clockwork mechanism. When winding knob 69 is released by the fingers, spiral spring 119 returns it to its normal position, carrying the shoulder of pin plate 117 against stop 118. Driving pin 122, however, remains in the position shown in Fig. 11 until the clockwork mechanism is started by pressing button 42, being held in this position through the gear train and ball clutch 65 (Figs. 7 and 14).

The shutter actuating mechanism is associated with the winding mechanism just described. It is tripped by the clockwork mechanism at the end of a two-minute operation thereof, in other words, at the end of a two-minute observation when the ball transmission 20 has reached the periphery of disk 18. The shutter mechanism is reset automatically during the turning of winding knob 69 through the half revolution above referred to.

Shutter 43 oscillates on a fixed pin 123 (Figs. 1 and 6) which projects from the right-hand side of a square tubular housing 124 which supports bubble chamber 4. It is actuated by a rocking movement of shaft 68 which has a small crank 125 at its outer end which is connected to shutter 43 by means of a link 126. In Figs. 1 and 6 the shutter is shown in its open position out of the path of the light entering the eye-piece tube. In its closed position the pointed tip of the shutter is interposed partially across this light path, so as to notify the user of the instrument that the two-minute observation period has terminated.

The rocking movement of shaft 68 to actuate shutter 43 is produced by means of a coil spring 127 surrounding shaft 68 (Fig. 6) which is placed under tension by the turning of winding knob 69 during the winding of the clockwork mechanism.

The mechanism for accomplishing this and for tripping the shutter to closed position will now be described.

Referring particularly to Fig. 13, shaft 68 has at its upper end above enlargement 67a, an integral head 128. In the edge of this head there is a setting notch 129 and a tripping notch 130, the latter having a flat cam surface 131 on one side. Setting notch 129 is adapted to be engaged by a setting pawl 132 and tripping notch 130 by a latch member 133 which is pivoted at 134 to a part fixed to housing 15. Latch 133 is held in engagement with notch 130 by a coil spring 135.

As shown in Fig. 11, the shutter has been set in open position by the turning of knob 69 to wind the clockwork mechanism. As soon as button 42 is pressed when taking a sight on a celestial body, the clockwork mechanism commences to operate and winding pawl 132, with its holding screw 136, will commence to move in a counter-clockwise direction, the end of the pawl receding from notch 129. Near the end of the two-minute observation period pawl screw 136 will be approaching a position one hundred eighty degrees from that shown in Fig. 11 and will engage a sloping surface 137 on a turned-down portion of latch 133 and gradually force the latch outward.

The adjustment is such that precisely at the end of the two-minute period the outer corner of notch 130 will be released by the latch, and shutter operating spring 127 will cause the rotation of shaft 68 to bring about the closing of the shutter 43, as previously described. During this movement head 128 will rotate, carrying winding notch 129 around toward winding pawl 132 which, as pointed out, has already moved to a position about 180 degress from that shown in Fig. 11. Therefore, the next time winding knob 69 is rotated to wind the clockwork mechanism, pawl 132 will engage winding notch 129 and return head 128 to the position shown in Fig. 11 where it is held by latch 133.

When an observation period proceeds for the full two-minute period, resulting in the closing of shutter 43, it is important that the clockwork mechanism and the outward movement of ball transmission 20, which is continuously increasing the gear ratio between disk 18 and drum 19, be stopped as closely as possible to the same instant that the shutter closes. With this in view, an automatic clockwork stopping mechanism is provided, actuated by latch 133.

This comprises a spring brake finger 138 (Fig. 5) adapted to frictionally engage the surface of balance wheel 77 of the escapement mechanism 39 (Fig. 5). Finger 138 is mounted at the upper end of a stop lever 139. Lever 139 is mounted for a combined lengthwise and rocking movement alongside of index release lever 111 (Figs. 5 and 17). The lower end of lever 139 is pivoted at 140 to latch 133.

In operation, when pawl screw 136, acting on sloping surface 137, finally forces the corner of latch 133 free from the corner of notch 130, the straight cam surface 131 at the right of notch 130 is quickly rotated by the shutter-actuating spring 127 and strikes the lower edge of latch 133 (which has moved slightly away from it) a blow. This kicks latch 133 outwardly and moves lever 139 to bring brake finger 138 instantly against the balance wheel 77. Head 128 is covered with a cap washer 141 which operatively separates the sickle-shaped index release cam 113 from shutter-setting pawl 132 and shutter-release latch 133.

In using the calculating instrument of the present invention the turning of the one winding knob 69 conditions the mechanism for operation. Furthermore, it is not necessary to know whether the value of the variable is greater or less at the end of the averaging period than at the beginning. In the case of a sextant therefore, the user does not have to take into account whether the celestial body upon which the sight is being taken is ascending or declining. At the end of the sight he simply turns control knob 8, moving index 44 in the direction indicated by the arrows on index 47, until index 44 is returned to its "zero" position. He then reads the counter 10 which shows the average altitude of the celestial body. He adds the time indicated by the time dial 40 to the chronometer time at the commencement of the observation, to give him the time at which the celestial body reached the average altitude indicated by counter 10.

If it is preferred to take a series of separate sights on the celestial body instead of using the continuous sight method, it will be understood that the improved averaging mechanism can be used to obtain the average value of the series of altitudes measured. It is necessary to read counter 10 but once, namely, after the final sight is taken and the index 44 adjusted to "zero" as just described.

It will be understood that the improved mechanism of the invention has a variety of applications and in fact can be utilized advantageously wherever the value to be averaged may be represented as successive movements of an indicating member, particularly successive angular movements of a shaft such as shaft 11. For example, the angular displacement of shaft 11 may be adjusted according to the power consumption of some particular apparatus or power system, or the power output of an electrical generating plant, or according to variations in temperature, fluid pressure, mechanical force, and the like. In adapting the mechanism for such use it might be desirable to increase the time required for the clockwork mechanism to move the ball transmission 20 from the center to the edge of disk 18, and this might involve also an increase of the diameter of the disk.

It will also be understood that other changes in the construction and arrangement of various parts of the mechanism may be made without departing from the spirit or scope of the invention, and consequently it is to be understood that the scope of the invention extends to such constructions as come within the meaning of the appended claims.

We claim:

1. In an averaging device, the combination of an indicating member arranged to move according to the value of a variable quantity, a movable averaging member, continuously variable ratio gearing interconnecting said members, means for increasing said ratio at a constant time rate during an averaging period, the movement of said indicating member causing a displacement of the averaging member from an initial to a final position, the gearing interconnecting said averaging member and said indicating member being such that said averaging member may be returned to its initial position by movement of said indicating member with said gearing remaining set at the ratio established when said averaging member was in said final position.

2. In an averaging device, the combination of an indicating member whose position is adjusted in proportion to the value of a variable quantity, a movable averaging member, a continuously variable ratio transmission mechanism interconnecting said members, means for increasing said ratio at a constant time rate during an averaging period, the movement of said indicating member during said period causing, through the transmission mechanism, a displacement of the averaging member and means for indicating the displacement of said averaging member from an initial to a final position, said transmission mechanism interconnecting said members being such that said averaging member may be returned to its initial position by movement of said indicating member with the transmission mechanism remaining set at the ratio established at the end of said averaging period.

3. In an averaging device, the combination of an indicating member arranged to move according to the value of a variable quantity, a movable averaging member, a continuously variable ratio friction gearing interconnecting said members adapted to change its ratio while maintaining a driving connection between said members regardless of whether said indicating member is stationary or moving, means for increasing said ratio at a constant time rate, the movement of said indicating member causing, through said gearing, a displacement of the averaging member and means for indicating the displacement of said averaging member from an initial to a final position, the gearing interconnecting said averaging member and said indicating member being such that said averaging member may be returned to its initial position by movement of said indicating member with the friction gearing remaining at the ratio established when said averaging member was at said final position.

4. In an averaging device, the combination of an indicating member whose position is adjusted in proportion to the value of a variable quantity, a movable averaging member, a continuously variable ratio transmission mechanism interconnecting said members, means for increasing said ratio at a constant time rate during an averaging period, the movement of said indicating member during said period causing, through the transmission mechanism, a displacement of the averaging member from an initial position to a final position, and means for indicating the position of the averaging member said transmission mechanism being such that the final position of the averaging member may be modified by movement of the indicating member while the transmission mechanism remains set at the ratio established at the end of said averaging period until the averaging member has been returned to its initial position.

5. In an averaging device, a disk adapted to have angular adjustment about its axis in proportion to the value of a variable quantity, means for indicating the angular displacement thereof, a rotatable cylindrical drum having its axis parallel to the face of the disk and intersecting the projection of the disk axis, a continuously variable ratio friction gearing interconnecting said disk and drum adapted to change its ratio while maintaining a driving connection between said disc and said drum regardless of whether said disk is stationary or moving, means for increasing said ratio at a constant time rate during an averaging period, the movement of said disk during said period causing, through said friction gearing, an angular displacement of the drum from an initial to a final position, and means for indicating the angular position of the drum, said gearing being such that the position assumed by the disc at the end of an averaging period may be modified by movement thereof while the friction gearing remains set at the ratio established at the end of said averaging period until the drum has been returned to its initial position.

6. In an averaging device, a disk adapted to have angular adjustment about its axis in proportion to the value of a variable quantity, means for indicating the angular displacement thereof, a rotatable cylindrical drum having its axis parallel to the face of the disk and intersecting the projection of the disk axis, a continuously variable ratio transmission mechanism interconnecting said disk and drum comprising two balls held in rotatable contact with each other and with said members, means for increasing said ratio at a constant time rate during an averaging period, the movement of said disk during said period causing, through said transmission mechanism, an angular displacement of the drum from an initial to a final position, and means for indicating the angular position of the drum said transmission mechanism being such that the position assumed by the disc at the end of an averaging period may be modified by movement thereof while the transmission mechanism remains set at the ratio established at the end of said averaging period until the drum has been returned to its initial position.

7. In an averaging device, a disk adapted to have angular adjustment about its axis in proportion to the value of a variable quantity, means for indicating the angular displacement thereof, a rotatable cylindrical drum having its axis parallel to the face of the disk and intersecting the projection of the disk axis, mechanism for transmitting motion between two points on the respective surfaces of the disk and drum, said points lying in a straight line intersecting the drum axis at right angles, a clockwork mechanism for shifting said transmission mechanism at a constant velocity radially outward from the center of the disk thereby causing, through said transmission mechanism, an angular displacement of said drum from an initial to a final position and means for indicating the angular position of said drum to enable the final position of said drum to be modified by movement of said disc while the transmission mechanism remains set at the ratio established at the end of an averaging period until said drum has been returned to its initial position.

8. In an averaging device, the combination of an indicating member arranged to move in proportion to the value of a variable quantity, a movable averaging member, a continuously variable ratio transmission mechanism interconnecting said members, means for increasing said ratio at a constant time rate during an averaging period, the movement of said indicating member during said period causing a displacement of the averaging member from an initial position to a final position, means for indicating the position of the averaging member said transmission mechanism being such that the final position of the averaging member may be modified by movement of the indicating member while the transmission mechanism remains set at the ratio established at the end of an averaging period until the averaging member has been returned to its initial position, and means for indicating the direction of said return movement of the averaging member to its initial position.

9. In an averaging device, the combination of an indicating member arranged to move in proportion to the value of a variable quantity, a movable averaging member, a continuously variable ratio transmission mechanism interconnecting said members, means for increasing said ratio at a constant time rate during an averaging period, the movement of said indicating member during said period causing displacement of the averaging member, means for indicating the extent of said displacement comprising an index dial adapted to be turned proportionally to the displacement of said averaging member said transmission mechanism interconnecting said averaging member and said indicating member being such that said averaging member may be moved from the position assumed at the end of the averaging period until said index dial registers the position indicated at the beginning of the averaging period, while said transmission mechanism remains set at the ratio established at the end of the averaging period.

10. In an averaging device, the combination of an indicating member arranged to move in proportion to the value of a variable quantity, a movable averaging member, a continuously variable ratio transmission mechanism interconnecting said members, means for increasing said ratio at a constant time rate during an averaging period, the movement of said indicating member during said period causing displacement of the averaging member from an initial position to a final position, and means for indicating the direction and extent of said displacement comprising a pair of index dials, operative connections for turning said dials from a zero position proportionally to the displacement of said averaging member, one of said dials turning at a lower rate than the other, said operative connections including a releasable clutch mechanism for each of said index dials, a biased cam follower carried by each index dial, and a common stationary cam co-acting with said followers to turn the index dials to zero when said clutch mechanisms are released.

11. In an averaging device, the combination of an indicating member arranged to move in proportion to the value of a variable quantity, a rotatable averaging member, a continuously variable ratio transmission mechanism interconnecting said members, means for increasing said ratio at a constant time rate during an averaging period, the movement of said indicating member during said period causing displacement of the averaging member from an initial position to a final position, means for indicating the direction and extent of said displacement comprising a pair of index dials, operative connections for turning said dials from a zero position proportionally to the displacement of said averaging member, one of said dials turning at a lower rate than the other, said connections including a releasable clutch mechanism for each of said index dials, a biased cam follower carried by each index dial, a common stationary cam co-acting with said followers to reset the index dials at zero when said clutch mechanisms are released, a winding device for winding said clockwork mechanism, and means actuated thereby for releasing said clutch mechanisms to cause the index dials to be reset simultaneously with the winding of the clockwork mechanism.

12. In an averaging device, the combination of an indicating member arranged to move in proportion to the value of a variable quantity, a movable averaging member, a continuously variable ratio transmission mechanism interconnecting said members, means for increasing said ratio at a constant time rate during an averaging period, the movement of said indicating member during said period causing displacement of the averaging member, means for indicating the extent of said displacement comprising an index dial, an operative connection including a releasable clutch mechanism for turning said dial from a zero position proportionally to the displacement of said averaging member, means to reset said dial at zero when the clutch mechanism is released, a winding device for winding said clockwork mechanism, and means actuated thereby for releasing said clutch mechanism to cause said index dial to be reset simultaneously with the winding of the clockwork mechanism.

13. In an averaging device, the combination of an indicating member arranged to move in proportion to the value of a variable quantity, a movable averaging member, a continuously variable ratio transmission mechanism interconnecting said members, a clockwork mechanism for increasing said ratio at a constant time rate during an averaging period commencing at zero ratio at the beginning of the period, the movement of said indicating member during said period causing a displacement of the averaging member, means for indicating the position of the averaging member, and a single means for winding said clockwork mechanism and simultaneously setting said transmission mechanism at zero ratio.

14. In an averaging device, the combination of an indicating member arranged to move in proportion to the value of a variable quantity, a movable averaging member, a continuously variable ratio transmission mechanism interconnecting said members, a clockwork mechanism for increasing said ratio at a constant time rate during a predetermined averaging period commencing at zero ratio at the beginning of the period, the movement of said indicating member during said period causing a displacement of the averaging member, means for indicating the position of the averaging member, automatic means for stopping said clockwork mechanism at the end of said averaging period, and means for winding said clockwork mechanism and simultaneously releasing said stopping means.

15. In an averaging device, the combination of an indicating member arranged to move in proportion to the value of a variable quantity, a movable averaging member, a continuously variable ratio transmission mechanism interconnecting said members, a clockwork mechanism for increasing said ratio at a constant time rate during a predetermined averaging period commencing at zero ratio at the beginning of the period, the movement of said indicating member during said period causing a displacement of the averaging member, means for indicating the position of the averaging member, automatic means for stopping said clockwork mechanism at the end of the averaging period, and means for winding said clockwork mechanism and simultaneously setting said transmission mechanism at zero ratio and releasing said stopping mechanism.

16. The combination with a sextant or the like, having a light path including an eye-piece and an angularly adjustable mirror, of an averaging mechanism comprising a pivoted indicating member operatively connected with said mirror to cause the angular position thereof to be adjusted in proportion to the adjustment of the mirror, a movable averaging member, a continuously variable ratio transmission mechanism interconnecting said members, a clockwork mechanism for increasing said ratio at a constant time rate during a predetermined averaging period commencing at zero ratio at the beginning of the period, the angular movement of said indicating member during said period causing a displacement of the averaging member, means for indicating the position of the averaging member, a spring-operated shutter biased into said light path between the mirror and eye-piece, latching means for holding said shutter out of the light path during the averaging period, automatic means for tripping said latching means at the end of said averaging period, and means for winding said clockwork mechanism and simultaneously setting said shutter.

17. In an averaging device, the combination of an indicating member arranged to move in proportion to the value of a variable quantity, a movable averaging member, a continuously variable ratio transmission mechanism interconnecting said members, a clockwork mechanism for increasing said ratio at a constant time rate during an averaging period, the movement of said indicating member during said period causing a displacement of the averaging member, means for indicating the position of the averaging member, and means for winding said clockwork mechanism comprising a winding knob, a shaft therefor, a second shaft in alignment therewith and operatively connected to wind said clockwork mechanism in less than a full turn of said shaft, unidirectional connecting means between said shafts to cause the turning of said second shaft by the winding knob shaft, and a spring biasing the winding knob shaft in a direction to disengage said connecting means so that contact of the user's hand with the winding knob during an averaging period will not retard the clockwork mechanism.

18. In an averaging device, a disk adapted to have angular movement about its axis in proportion to the value of a variable quantity, means for indicating angular displacement thereof, a movable averaging member, a carriage supporting two balls in rotatable contact with each other and with said disc and said averaging member respectively, means for mounting said carriage to move parallel to the face of the disk carrying said balls from the center of the disk radially outward, spring means for biasing said carriage in the outward direction, a balance wheel and escapement mechanism actuated by the carriage to control its movement at a constant rate, movement of the disk being communicated to the averaging member through said balls, means for indicating the resulting displacement of said averaging member and means to stop the movement of said carriage and hold it in the position assumed when stopped so that the averaging member may be returned to its initial position without changing the position of said carriage.

19. In an averaging device, a disk adapted to have angular movement about its axis in proportion to the value of a variable quantity, means for indicating the angular displacement thereof, a rotatable cylindrical drum having its axis parallel to the face of the disk and intersecting the projection of the disk axis, a carriage supporting two balls in rotatable contact with each other and with the disk and drum respectively, means for mounting said carriage to move parallel to the face of the disk carrying said balls from the center of the disk radially outward, a spring means biasing said carriage in the outward direction, a balance wheel and escapement mechanism actuated by said carriage to control its movement at a constant rate, movement of the disk being communicated to the drum through said balls, means for indicating the resulting angular displacement of the drum and means to stop the movement of said carriage and hold it in the position assumed when stopped so that the averaging member may be returned to its initial position without changing the position of said carriage.

20. The combination with a sextant or the like having an altitude indicator of an averaging mechanism comprising a pivoted member operatively connected to said altitude indicator to cause the angular position of said pivoted member to be registered by said altitude indicator, a movable averaging member, a continuously variable ratio transmission interconnecting said members, a clockwork mechanism for increasing said ratio at a constant time rate during an averaging period, the angular movement of said pivoted member causing a displacement of said averaging member, means for indicating the final displacement of said averaging member, said pivoted member being so connected to said averaging member that said averaging member may be returned to its initial position by movement of said pivoted member while said transmission remains at the ratio established at the end of the averaging period thereby enabling the average altitude to be read on said altitude indicator.

21. The combination with a sextant or the like having an altitude indicator of an averaging mechanism comprising a movable disk operatively connected to said altitude indicator to cause the position of said disk to be indicated by said indicator, a revolvable drum, a continuously variable ratio transmission interconnecting said disk and drum, a clockwork mechanism for increasing said ratio at a constant time rate during an averaging period, means to start and stop said clockwork mechanism, the movement of said disk causing a displacement of said drum, means for indicating the displacement of said drum at the time said clockwork is stopped, said disk being so connected to said drum that said drum may be returned to its initial position by movement of said disk while said transmission remains at the ratio established at the end of the averaging period thereby enabling the average altitude to be read on said altitude indicator.

22. In a sextant or the like having an altitude indicator, an averaging mechanism comprising an indicating member operatively connected to said altitude indicator and adapted to move therewith, a movable averaging member, a continuously variable ratio transmission mechanism interconnecting said members including two balls held in rotatable contact with each other and said members respectively, means for increasing the ratio of said transmission at a constant time rate, the movement of said indicating member causing through the transmission mechanism a displacement of the averaging member and means for indicating the resulting displacement of said averaging member from an initial to a final position, said transmission mechanism being so arranged that said averaging member may be returned to its initial position by movement of said indicating member with the transmission remaining set at the ratio established at the final position of said indicating member thereby enabling the average altitude to be indicated directly by the altitude indicator.

23. In a sextant or the like having an altitude indicator, the combination of an averaging mechanism comprising a disc mounted for angular adjustment about a central axis operatively connected to said altitude indicator, a cylindrical drum having its axis parallel to the face of the disc and intersecting the projection of the disc axis, mechanism for transmitting motion between two points on the respective surfaces of the disc and drum, said points lying in a straight line intersecting the drum axis at right angles, means for shifting the transmission mechanism radially outward from the center of the disc at a constant time rate, the disc being angularly adjusted simultaneously by movement of the altitude indicator and causing through the transmission mechanism angular displacement of the drum, means for indicating the initial position and the final position of said drum, said transmission mechanism being such that the indicating means may be turned back to its initial position by movement of the altitude indicator with the transmission mechanism remaining set at the radial distance assumed at the final displaced position of said drum so that the average altitude may be read directly on the altitude indicator.

RICHARD FRANCIS DEIMEL.
WILLIAM ALEXANDER BLACK.

REFERENCES CITED

The following references are of record in the file of this patent:

UNITED STATES PATENTS

| Number | Name | Date |
|---|---|---|
| 765,531 | Weston | July 19, 1904 |
| 864,379 | Junghans | Aug. 27, 1907 |
| 1,409,547 | Hosch, Dec'd. | Mar. 14, 1922 |
| 1,439,097 | Graham | Dec. 19, 1922 |
| 2,140,579 | Gray | Dec. 20, 1938 |
| 2,248,072 | Fry | July 8, 1941 |
| 2,252,341 | Everitt | Aug. 12, 1941 |
| 2,285,856 | Everitt | June 9, 1942 |
| 2,337,045 | Holt | Dec. 21, 1943 |